United States Patent Office 3,405,046
Patented Oct. 8, 1968

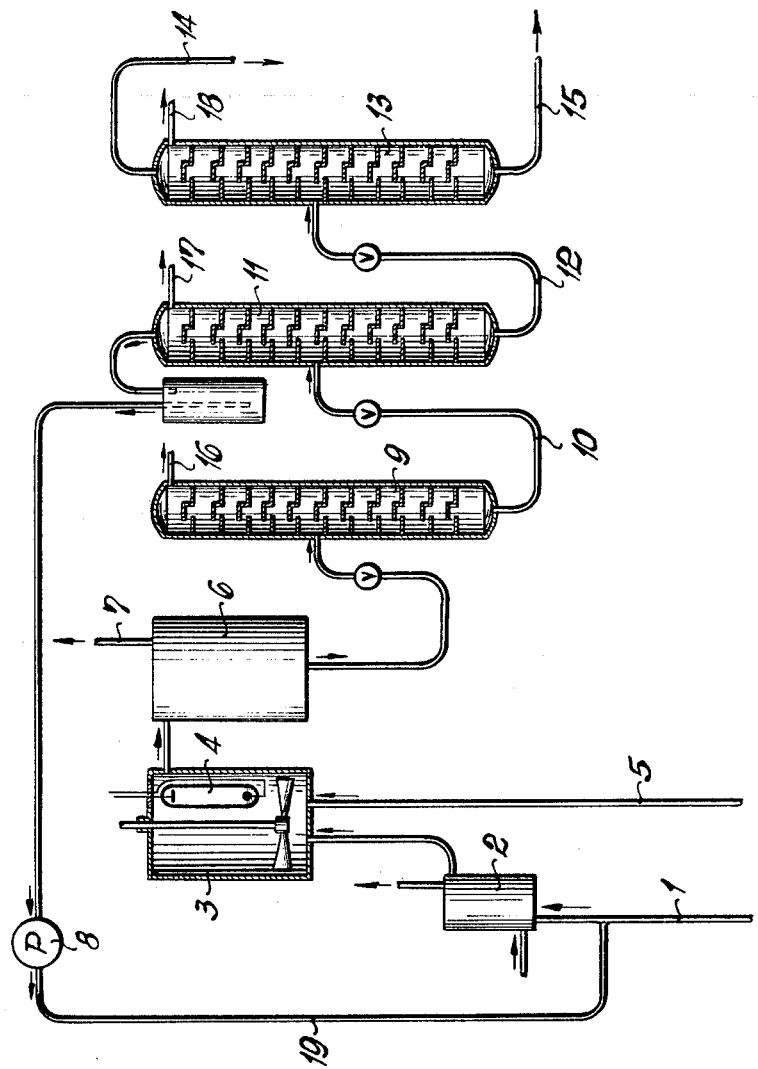

3,405,046
PROCESS FOR THE MANUFACTURE OF
2,2,3-TRICHLOROBUTANE
Kurt Sennewald and Wilhelm Vogt, Knapsack, near Cologne, and Herbert Baader, Hermulheim, near Cologne, Germany, assignors to Knapsack Aktiengesellschaft, Knapsack, near Cologne, Germany, a corporation of Germany
Filed Oct. 19, 1965, Ser. No. 497,986
Claims priority, application Germany, Nov. 3, 1964, K 54,429
7 Claims. (Cl. 204—163)

ABSTRACT OF THE DISCLOSURE

A process for producing 2,2,3-trichlorobutane by admixing butene-(2) with chlorine at a molar ratio of about 1.5–2:1 at a temperature of 0 to −80° C. in the presence of ultra violet irradiation.

The present invention relates to a process for the manufacture of 2,2,3-trichlorobutane by chlorinating butene-(2).

2,2,3-trichlorobutane is a valuable starting product for making 2-chlorobutadiene-(1,3).

It is known that 2,2,3-trichlorobutane can be prepared by chlorinating 2,3-dichlorobutane. The chlorination of butene-(2) or butane results in the formation of mixtures of isomers which inter alia include small amounts of 2,2,3-trichlorobutane.

It is also possible to prepare 2,2,3-trichlorobutane by an additive combination of chlorine with 2-chlorobutane-(2).

Processes of the type wherein butene-(2) and butane are chlorinated at temperatures between about −30 and +500° C. without special exposure to light have the disadvantage of incurring the formation of very small amounts of 2,2,3-trichlorobutane as a by-product, which is often obtained in admixture with further trichlorobutanes. 2,2,3-trichlorobutane has therefore been prepared heretofore by a multiple stage process, preferably by the additive combination of chlorine with butene-(2) to give 2,3-dichlorobutane. This latter compound was in turn further substituted or dehydrochlorinated to give 2-chlorobutene-(2) which was again combined with chlorine so as to produce 2,2,3-trichlorobutane. Apart from the complicated procedure, 2,2,3-trichlorobutane was always obtained in admixture with other trichlorobutanes. 2,2,3-trichlorobutane and 1,2,3-trichlorobutane generally formed in a molar ratio of 2.2:1 to 2.8:1, that is to say that 2,2,3-trichlorobutane was generally obtained in a yield of about 70%.

The present invention now provides a process for chlorinating butene-(2) in a single process step with the resulting formation of 2,2,3-trichlorobutane as the principal product.

The chlorination is carried out at low temperatures, generally at a temperature of 0 to −80° C. As the reaction velocity is very small at such temperatures, it is convenient to accelerate the formation of 2,2,3-trichlorobutane by radiation with ultraviolet light. The reaction can be carried out by adding gaseous or liquid chlorine to liquid butane-(2). The lower the chlorine concentration, the better are the yields, but the smaller are the conversion rates. It is therefore advantageous to dilute the chlorine and/or butene-(2) with a solvent, which is preferably a hydrocarbon or chlorinated hydrocarbon of the useful type obtained during the process. 2,3-dichlorobutane which also transforms under the reaction conditions into 2,2,3-trichlorobutane is most conveniently used.

After a short induction period, the reaction gives rise to the evolution of HCl. No induction period is observed when a solution saturated with HCl is employed.

In the process of the present invention, the butene-(2) is practically completely transformed. 2,3-dichlorobutane is obtained as the principal product when an insufficient proportion of chlorine is added, whereas higher chlorinated products are obtained when the proportion of chlorine added is too large. The chlorine should therefore be used in a proportion of about 1.5 to 2 mols per mol butene-(2).

After removal from the chlorinating reactor, the reaction product is freed from hydrogen chloride by injecting a gas stream and/or by distillation. The 2,2,3-trichlorobutane obtained is ultimately worked up by conventional distillation.

Photochemical decomposition and polymerization of butene-(2) are known to be initiated by excited Hg and Cd. The reaction of the present invention must therefore be deemed to incur an unexpected result because the butene-(2) does neither polymerize nor decompose under the present reaction conditions under heavy radiation with a mercury high pressure lamp. Relatively heavy radiation is, however, necessary to initiate the reaction, and, in conjunction with the low chlorinating temperature, it determines the reaction to proceed selectively. This can readily be observed as diminishing the light intensity immediately results in the evolution of free chlorine in the reaction liquid. The quantum yield is most likely relatively small. Neither butene-(2) chlorination at low temperatures with substantial exclusion of light, nor chlorination thereof in diffused light at −20° C. permitted observing the formation of 2,2,3-trichlorobutane as the principal product.

It is also known that dihalogeno-butanes of the type based on butene-(2) and chlorine can readily be chlorinated further at elevated temperature. The optimum temperatures for making 2,3-dichlorobutane from butene-(2) and chlorine should be expected to vary between −30 and +100° C. In the present process, the formation of the higher-chlorinated trichlorobutane is, however, favored by low temperatures which advantageously are even below −30° C. This reaction could not be foreseen and therefore incurs an unexpected result.

Seen under technical aspects, the present process permits obtaining yields substantially improved as compared with those obtained in conventional multiple stage processes, and it also permits making 2,2,3-trichlorobutane in a single process stage. Still further, the formation of 1,2,3-trichlorobutane as a by-product is substantially repressed. In the stagewise chlorination of butene-(2) to give 2,2,3-trichlorobutane, the molar ratio of 2,2,3-trichlorobutane to 1,2,3-trichlorobutane is at about 2.2:1 to 2.8:1, whereas the present process permits obtaining at least a molar ratio of 4:1. A further advantage of the present process resides in the fact that 1,2,3-trichlorobutane is obtained in small amounts, which anyway is difficult to transform into 2-chlorobutadiene-(1,3) in a plurality of steps.

The present invention relates more especially to a process for making 2,2,3-trichlorobutane by reacting butene-(2) with chlorine which comprises reacting chlorine with butene-(2) in the molar ratio of about 1.5–2:1, at a temperature of 0 to −80° C., preferably 0 to −50° C., with radiation of ultraviolet light. The butene-(2) and/or chlorine is advantageously diluted with a solvent, which is preferably a hydrocarbon or chlorinated hydrocarbon. The butene-(2) and/or chlorine can more especially be diluted with 2,3-dichlorobutane such as obtained as a by-product during the reaction. A method of carrying out the reaction comprises reacting liquid butene-(2) with a solution of chlorine in 2,3-dichlorobutane with exposure to light in a reaction zone, removing evolved hydrogen chloride gas, which may be blown out by means of an inert gas stream, liberating resulting reaction product from residual hydrogen chloride in a first distilling stage by distilling under reduced pressure, distilling off 2,3-dichlorobutane in a second distilling stage under reduced pressure, mixing the 2,3-dichlorobutane with fresh chlorine and recycling the resulting mixture to the reaction zone, and distilling off pure 2,2,3-trichlorobutane at the head of a third distilling stage while retaining 1,2,3-trichlorobutane in the sump phase of the said third distilling stage.

The following examples illustrate the process of the present invention with reference to the accompanying flow scheme.

Example 1

339.6 mols butene-(2) were introduced within 93 hours through line 1 and heat exchanger 2 into stirring vessel 3. About 679.2 mols chlorine were supplied concurrently therewith through line 5, whereas about 12 mols/hr. 2,3-dichlorobutane coming from column 11 and travelling through line 19 were steadily cycled. The stirring reactor 3 (2 liters capacity) was provided with a 70 watt mercury high pressure lamp and maintained at a temperature of about −10 to −20° C. Reaction product was conveyed from stirring reactor 3 to post-reactor 6 from which hydrogen chloride was removed through line 7. Residual hydrogen chloride was withdrawn at the head of a first distilling column 9 at a pressure of 600 mm. mercury through line 16. The sump phase of column 9 was conveyed through line 10 to a second distilling column 11 which was operated under a pressure of 400 mm. mercury. 2,3-dichlorobutane was removed overhead and recycled through pump 8 and line 19 to reactor 3. The sump phase of column 11 travelled through line 12 to a third distilling column 13 at the head of which desired 2,2,3-trichlorobutane could be withdrawn through line 14, whereas the sump phase of column 13, which consisted predominantly of 1,2,3-trichlorobutane, could be withdrawn through line 15. Lines 16, 17 and 18 were connected through cooling traps to pumps which served to adjust the pressure prevailing in each column. 272.1 mols 2,2,3-trichlorobutane and 67.1 mols sump phase, related to 1,2,3-trichlorobutane, were obtained. The butene-(2) underwent a practically quantitative conversion and 2,2,3-trichlorobutane was obtained in a yield of about 80%.

Example 2

The test plant shown in the accompanying drawing was charged within 83 hours with 209.5 mols butene-(2) and 426.1 mols chlorine. The chlorination temperature in the reactor varied between −35 and −40° C. 178 mols 2,2,3-trichlorobutane and 32.8 mols sump phase, which consisted essentially of 1,2,3-trichlorobutane, were obtained.

The butene-(2) conversion rate was quantitative and 2,2,3-trichlorobutane was obtained in a yield of 85%.

We claim:

1. A process for the manufacture of 2,2,3-trichlorobutane by reacting butene-(2) with chlorine which comprises reacting chlorine and butene-(2) in the molar ratio of about 1.5–2:1, at a temperature within the range of 0 to −80° C. with radiation of ultraviolet light.

2. A process as claimed in claim 1, wherein the reaction is carried out at a temperature within the range of 0 to −50° C.

3. A process as claimed in claim 1, wherein the butene-(2) and chlorine, respectively, are diluted with a solvent.

4. A process as claimed in claim 3, wherein the solvent is at least one member selected from the group consisting of hydrocarbons and chlorinated hydrocarbons.

5. A process as claimed in claim 1, wherein the butene-(2) and chlorine, respectively, are diluted with 2,3-dichlorobutane such as obtained as a by-product during the reaction.

6. A process as claimed in claim 1, wherein liquid butene-(2) is reacted with a solution of chlorine in 2,3-dichlorobutane with exposure to light in a reaction zone, evolved hydrogen chloride gas is removed, resulting reaction product is liberated from residual hydrogen chloride in a first distilling stage by distillation under reduced pressure, 2,3-dichlorobutane is distilled off in a second distilling stage under reduced pressure, the 2,3-dichlorobutane is mixed with fresh chlorine and recycled to the reaction zone, and pure 2,2,3-trichlorobutane is distilled off at the head of a third distilling stage, while 1,2,3-trichlorobutane is retained in the sump phase of the said third distilling stage.

7. A process as claimed in claim 6, wherein the hydrogen chloride gas is blown out by means of an inert gas stream.

References Cited
UNITED STATES PATENTS

| | | | |
|---|---|---|---|
| 1,191,916 | 7/1916 | Brooks et al. | 204—163 |
| 2,899,370 | 8/1959 | Rosenberg | 204—163 |

HOWARD S. WILLIAMS, *Primary Examiner.*